Figure 5:
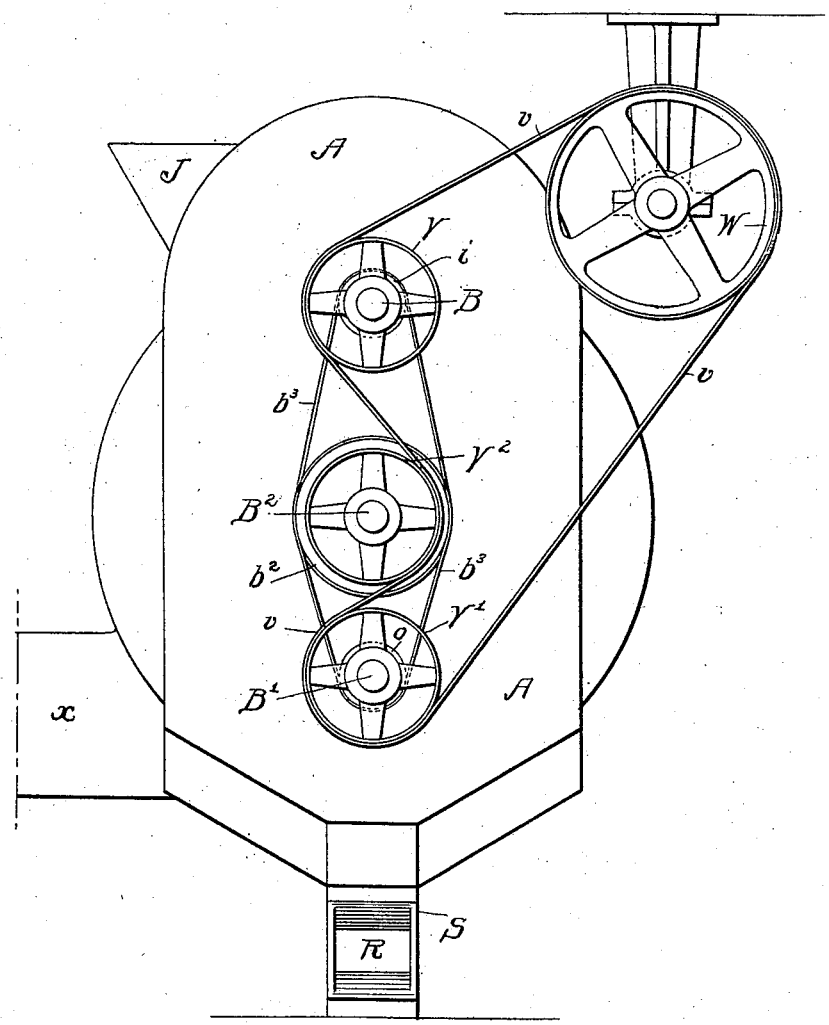

(No Model.) 3 Sheets—Sheet 1.
B. G. ROYAL.
GRAIN CLEANING AND SCALPING.
No. 577,538. Patented Feb. 23, 1897.
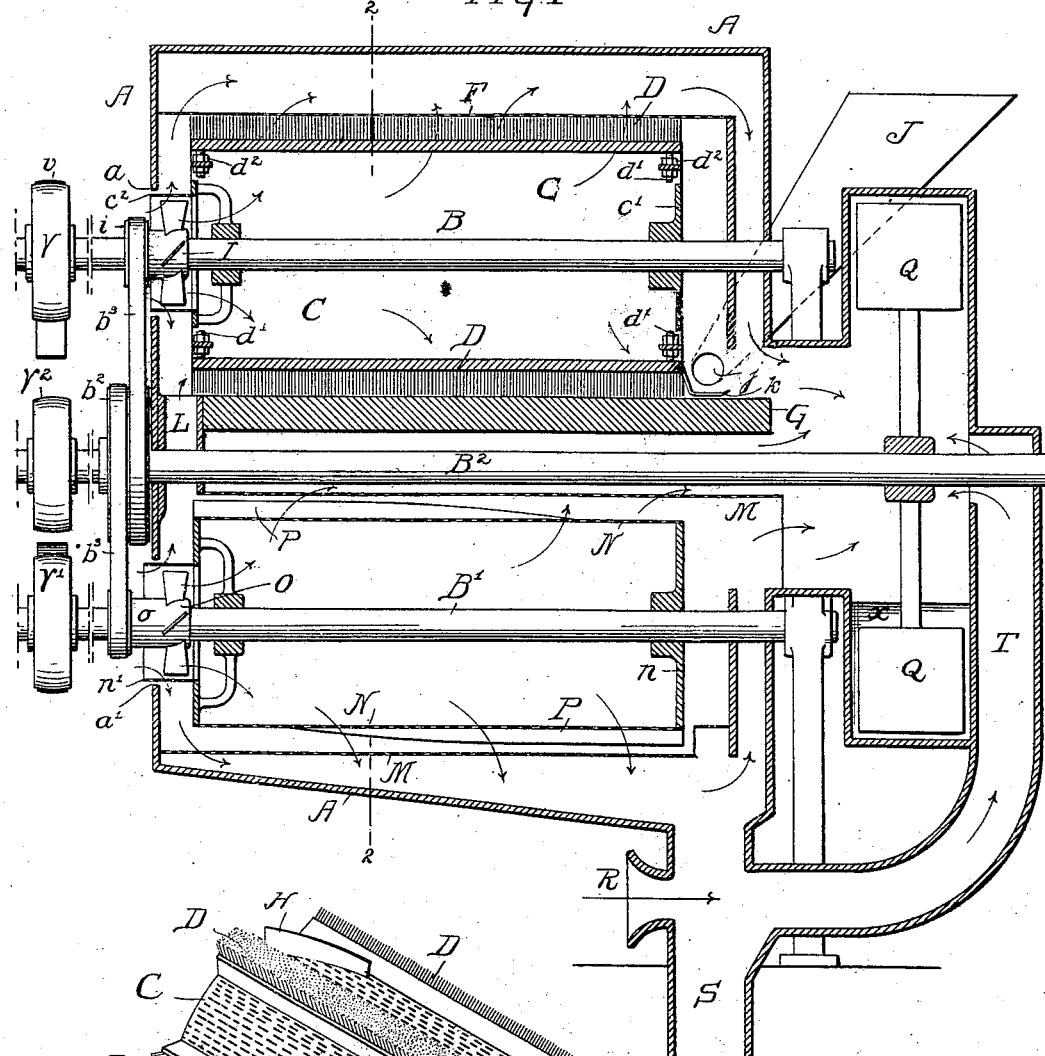

(No Model.)  3 Sheets—Sheet 2.
B. G. ROYAL.
GRAIN CLEANING AND SCALPING.
No. 577,538.   Patented Feb. 23, 1897.
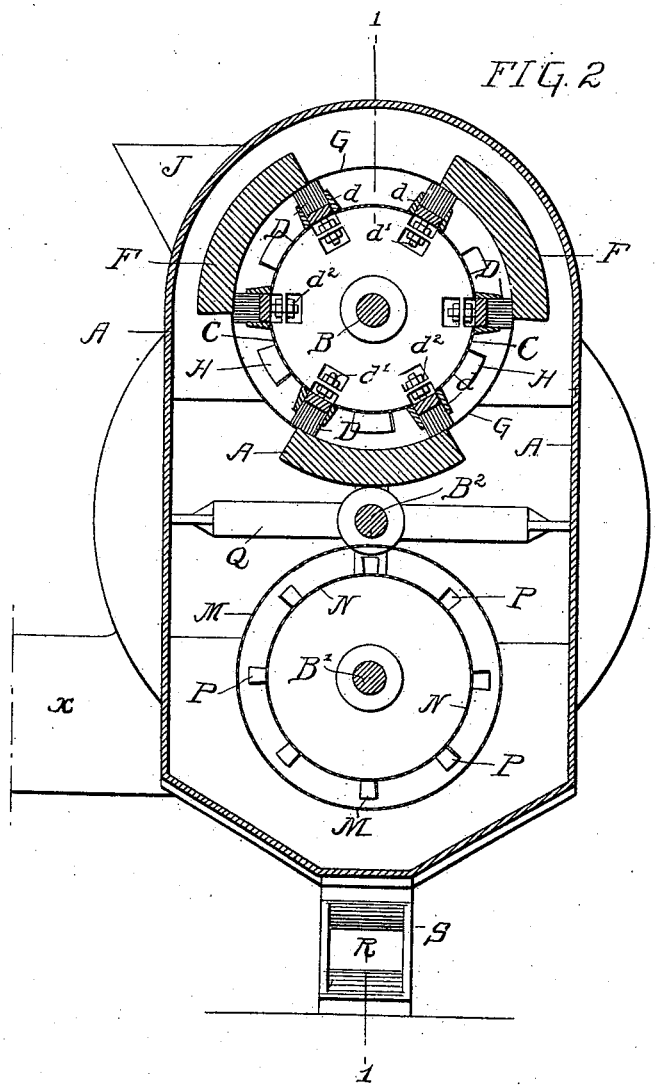
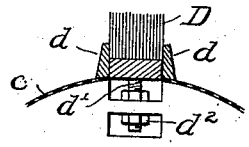
Witnesses:
Jno. E. Parker
J. Henderson.
Inventor:
Belford G. Royal,
by his Attorney,
Horace Pettit (No Model.)

3 Sheets—Sheet 3.

B. G. ROYAL.
GRAIN GLEANING AND SCALPING.

No. 577,538.

Patented Feb. 23, 1897.

UNITED STATES PATENT OFFICE.

BELFORD G. ROYAL, OF CAMDEN, NEW JERSEY.

GRAIN CLEANING AND SCALPING.

SPECIFICATION forming part of Letters Patent No. 577,538, dated February 23, 1897.

Application filed April 15, 1896. Serial No. 587,581. (No model.)

*To all whom it may concern:*

Be it known that I, BELFORD G. ROYAL, a citizen of the United States, and a resident of Camden, county of Camden, State of New Jersey, have invented a certain new and useful Improvement in Grain Cleaning and Scalping Machines, of which the following is a full, clear, and exact description, reference being had to the accompanying drawings, forming part of this specification.

My invention relates to certain improvements in that class of machines employed to remove the hulls from grains of wheat or other cereals, and has for its object to provide for the more thorough and complete removal of such outer covering or hull and to enhance the value of the cereals as a food product by cleaning and polishing the same.

In the accompanying drawings, Figure 1 is a sectional elevation on the line 1 1, Fig. 2, of a grain cleaning and scalping machine constructed in accordance with my invention. Fig. 2 is a transverse sectional elevation of the same on the line 2 2, Fig. 1. Fig. 3 is a detached perspective view of the brush-carrying drum. Fig. 4 is a transverse sectional view of a portion of the said drum on an enlarged scale; and Fig. 5 is an end elevation of the machine, illustrating the arrangement of driving-belts.

Referring to the drawings, A represents a suitable casing in which are formed bearings for shafts B, B', and B². On the upper shaft B is secured a drum C, composed for the main part of perforated sheet metal $c$, and carrying on its periphery a series of longitudinally-arranged brushes D, made of steel wire or similar material, and secured to the periphery of the drum, in the manner hereinafter described, so as to be adjustable on radial lines from the center. One end of the cylinder at $c'$ is closed and the opposite end has a tubular extension or flange $c^2$, also made of perforated metal and extending through a circular opening $a$ in the casing A of the machine.

Each brush D is of the same length as the cylinder C and fits between radial flanges $d$, secured to the periphery of the drum, while the opposite ends of the brush are secured in position by means of screws $d'$, having adjustable nuts $d^2$, by turning which the distance of the brush from the center of rotation of the drum is regulated to a considerable extent, while the guards $d$ extend a sufficient distance above the surface of the drum to prevent the wires of which the brushes are formed from bending. By using these guards $d$ the brushes when originally applied to the cylinder may be of wires of considerable length, the guards giving them, when in use, the necessary stiffness, and as the brushes wear away they may be adjusted, as from time to time may be required, by turning the nuts $d^2$.

Between the brushes D the periphery of the drum is provided with a series of deflectors H, so arranged that when the drum is revolving the deflectors will cause the grain being treated to travel along the length of the cylinder, the rear end of each deflector extending some distance beyond the forward edge of the next deflector of the series, as shown in Fig. 3, so that any grain caught and carried by the first deflector will next be acted upon by the second deflector, and then by the third deflector, and so on until the end of the drum has been reached.

Surrounding the drum C is a cylinder composed of alternately-arranged sections of grinding-stones F and perforated sheet metal G, the perforations being large enough to permit the passage of the hulls of the grain, but not large enough to allow the grain to escape.

At one end of the casing is arranged a hopper J, through which the wheat or other grain is fed into the machine, the grain being discharged through an opening $j$ at the end of the cylinder and in the path of one or more small shovels $k$, extending some distance beyond the end of the drum and arranged in such manner as to pick up the grain from the place of delivery and carry it to the highest point of the drum, where it will be caught by the brushes D and the deflectors H and traversed through the machine, the brushes D rubbing the grain over the abrading-surfaces of the grinding-stones and removing the outer covering or hull, which escapes through the opening in the sheet-metal portion G of the outer cylinder, and is thence carried away by a suitable air-blast. The deflectors H act to throw the grain against the perforated sheet metal, keeping the grain suspended in the air during the hulling operation and keeping it loose and separated for the passage of the air-blast, so that the grain will be kept perfectly cool. The deflectors throw the wheat against the outer cylinder, so that the brushes may catch the grain and force the same against the stones. The grain on reaching the end of the drum passes through a discharge-spout L to a rumbler to be further treated, and when it arrives at this point the major portion of the hulls have been removed from the grains and any smaller particles which may still cling to the surface are removed in the rumbler and the surface of the grain is cleansed and polished and in condition to be used as a food-product or for the production of flour.

On the lower shaft B' is the drum N of the rumbler, said drum being formed of perforated sheet metal or wire-netting and having a closed end $n$ and a tubular extension or flange $n'$, also formed of sheet metal, extending through a circular opening $a'$ on the casing A of the machine. On the surface of the drum N are a series of blades or deflectors P, which act to throw the grain being treated against a stationary cylinder M, surrounding the drum N, and formed of perforated sheet metal to permit of the passage of any particles of hull which may be removed by the action of the rumbler-cylinder and the air-currents which traverse the apparatus.

The central shaft $B^2$ carries a suction-fan Q, the central portion of which is in communication with the interior of the casing A and draws a continuous current of air through the openings $a$ and $a'$, which currents of air pass through the interior of the drums C and N and through the perforated sheet metal G of the upper cylinder and the perforated sheet metal M of the lower cylinder directly across the points where the grain is being acted upon and serve to carry off through the openings in the sheet metal any particles of hull which may be loosened by the abrading action of the brushes and the stones F and by the rotating drum N.

On the shafts B and B', at points within the flanges $c^2$ and $n'$ of the upper and lower drums, respectively, are loosely-mounted fans I and O, which aid the larger fan in inducing the currents of air within the casing. The fans I and O are provided with small pulleys $i$ and $o$, respectively, which are driven from the shaft $B^2$ through the medium of belts $b^3$ from the pulley $b^2$. These smaller fans being mounted within the circular and perforated sheet-metal flanges of the drums will force air outwardly through the perforations in such flanges and will also force air into the interior of the hollow drum, and as such air cannot escape through the closed ends of the drums it is compelled to travel the perforations of the drums and of the perforated cylinders which surround them and to forcibly remove any loosened particles of hulls. The treated grain finally escapes through a discharge-pipe S, but as at this point there is a possbility of some of the loosened hulls being carried down by the weight of the grain I provide in such pipe an opening R and at a point diametrically opposite to such opening is formed a pipe T, leading to the eye of the fan Q in such manner that a current of air will be induced across the pipe S, through which the grain falls, and any particles of hull being carried down will be drawn up through the pipe T by the action of the fan, and the hulls, &c., are discharged from the fan through a discharge-outlet, as $x$.

In order to provide for the running of the various parts, pulleys V, V', and $V^2$ are secured to the shafts B, B', and $B^2$, respectively, and over these pulleys passes a single belt $v$ from a main driving-pulley W, so that it is necessary to employ but one belt to transmit power to all of the shafts, as shown more clearly in Fig. 5.

Having thus described my invention, what I claim, and desire to secure by Letters Patent, is—

1. The combination with a stationary cylinder composed of alternately-arranged abrading-stones and perforated sheet metal, of a hollow rotatable drum closed at its inner end and having its periphery perforated to allow the air to pass through the circumferential walls from within, a series of brushes arranged on the periphery of said drum, and deflectors between said brushes, said deflectors being made in a series of short sections, and arranged in each of the intervening spaces between the brushes in a substantially helical line around the periphery and along the whole length of the drum, substantially as specified.

2. In a grain cleaning and scalping machine the combination with a stationary cylinder having alternately-arranged abrading-stones and perforated sheet metal, of a hollow rotatable drum closed at one end and perforated to allow of the passage of currents of air through its circumferential walls and thence through the perforated sheet metal of the cylinder, a series of adjustable brushes arranged on the periphery of the drum, and deflectors between said brushes constructed of short sections arranged approximately longitudinally of the drum, the whole series forming substantially a helical line around the periphery of the drum as set forth.

3. The combination with a stationary cylinder composed of alternately-arranged abrading-stones and perforated sheet metal, of a rotatable perforated drum, a shaft carrying the same, brushes on said drum, a tubular extension or flange formed on the end of the drum and extending through an opening in the casing of the apparatus and a fan loosely mounted upon said shaft at a point within said flange.

4. The combination of a casing, a stationary cylinder composed of alternately-arranged abrading-stones and perforated sheet metal, a drum of perforated sheet metal, brushes carried by said drum, intermediate deflecting-blades on the periphery of the drum, a flange, $c^2$, provided at one end of the drum and projecting through an opening in the casing, a fan, I, loosely mounted on the shaft at a point within said flange, and mechanism for rotating said shaft.

5. The combination of the casing, the abrading-cylinder, a drum within said cylinder having on its periphery a series of brushes, a shaft carrying said drum, a fan mounted on said shaft, a lower stationary cylinder formed of perforated sheet metal, a perforated sheet-metal drum adapted to rotate within said cylinder, deflecting-blades on said drum, a shaft carrying said drum, a fan mounted thereon, a shaft, $B^2$, and an exhaust-fan, Q, mounted on said shaft, $B^2$, and in communication with the interior of the casing, substantially as specified.

6. The combination of the casing, A, having openings, $a$, $a'$, shafts, B, B', and $B^2$, a stationary cylinder formed of alternately-arranged abrading-stones, F, and perforated sheet metal, G, a perforated sheet-metal drum, C, mounted on the shaft, B, and having a closed end, $c$, and a flange, $c'$, a fan, I, loosely mounted on the shaft, brushes, D, and deflectors, H, on the periphery of the drum, a hopper, J, a shovel, $k$, carried by the drum, a stationary cylinder, M, of perforated sheet metal, a rotatable drum, N, formed of perforated sheet metal and mounted on a shaft, B', a tubular extension or flange, $n'$, formed at one end of the drum, N, a fan, O, loosely mounted on the shaft, B', deflectors, P, on the periphery of said drum, an exhaust-fan, Q, on the shaft, $B^2$, a discharge-pipe, S, having an opening, R, and a pipe, T, leading from the pipe, S, to exhaust-fan, Q, substantially as specified.

In witness whereof I have hereunto set my hand this 8th day of April, A. D. 1896.

BELFORD G. ROYAL.

Witnesses:
EDMUND S. MILLS,
JNO. E. PARKER.